United States Patent [19]

Montagna et al.

[11] Patent Number: 5,691,000

[45] Date of Patent: *Nov. 25, 1997

[54] PROCESS FOR SURFACE TREATMENT OF CELLULOSIC, METALLIC, VITREOUS MATERIALS, OR CEMENTS, MARBLES, GRANITES AND THE LIKE

[75] Inventors: Laura Montagna, Milan; Mauro Scapin, Varese; Rosaldo Picozzi, Milan, all of Italy

[73] Assignee: Ausimont S.p.A., Milan, Italy

[*] Notice: The term of this patent shall not extend beyond the expiration date of Pat. No. 5,395,657.

[21] Appl. No.: 487,233

[22] Filed: Jun. 7, 1995

[30] Foreign Application Priority Data

Jun. 14, 1994 [IT] Italy .................. MI94A1230

[51] Int. Cl.$^6$ .................................................. B05D 3/02
[52] U.S. Cl. ............................ 427/388.4; 427/389.7; 427/392; 427/393.4; 427/393.6; 427/396
[58] Field of Search .................... 427/388.1, 388.4, 427/389.7, 389.9, 391, 392, 393.4, 393.6, 394, 395, 396

[56] References Cited

U.S. PATENT DOCUMENTS

| | | | |
|---|---|---|---|
| 3,112,241 | 11/1963 | MacKenzie et al. | 162/164 |
| 3,188,340 | 6/1965 | Mackenzie . | |
| 3,242,218 | 3/1966 | Miller | 260/615 |
| 3,293,306 | 12/1966 | Le Bleu et al. | 260/615 |
| 3,492,374 | 1/1970 | Le Bleu et al. | 260/950 |
| 3,692,885 | 9/1972 | Anello et al. | 260/950 |
| 3,715,378 | 2/1973 | Sianesi et al. | 260/463 |
| 3,810,874 | 5/1974 | Mitsch et al. | 260/75 H |
| 3,847,978 | 11/1974 | Sianesi et al. | 260/535 H |
| 3,899,366 | 8/1975 | Tajkowski | 148/6.16 |
| 3,919,361 | 11/1975 | Katsushima et al. | 260/953 |
| 4,085,137 | 4/1978 | Mitsch et al. | 260/561 HL |
| 4,499,146 | 2/1985 | Piacenti et al. | 428/422 |
| 4,523,039 | 6/1985 | Lagow et al. | 568/615 |
| 4,536,444 | 8/1985 | Sumija et al. | 428/340 |
| 4,745,009 | 5/1988 | Piacenti et al. | 427/393.5 |
| 4,746,550 | 5/1988 | Strepparola et al. | 427/385.5 |
| 4,814,372 | 3/1989 | Caporiccio et al. | 528/485 |
| 5,000,864 | 3/1991 | Strepparola et al. | 252/51.5 H |
| 5,132,446 | 7/1992 | Tohzuka et al. | 558/186 |
| 5,294,248 | 3/1994 | Chittofrati et al. | 106/10 |
| 5,395,657 | 3/1995 | Strepparola et al. | 427/393.6 |

FOREIGN PATENT DOCUMENTS

| | | |
|---|---|---|
| 0 148 482 A2 | 7/1985 | European Pat. Off. . |
| 0 338 531 A2 | 10/1989 | European Pat. Off. . |
| 0 340 740 A2 | 11/1989 | European Pat. Off. . |
| 0 453 406 A1 | 10/1991 | European Pat. Off. . |
| 0 603 697 A1 | 6/1994 | European Pat. Off. . |
| 1104482 | 2/1968 | United Kingdom . |
| WO 90/03357 | 4/1990 | WIPO . |

*Primary Examiner*—Erma Cameron
*Attorney, Agent, or Firm*—Finnegan, Henderson, Farabow, Garrett & Dunner

[57] ABSTRACT

Phosphoric monoesters of formula:

$$[R_f-O-CFY-L-O]_m P(O^-Z^+)_{3-m} \quad (I)$$

wherein:
L is a divalent organic group; m=1; Y is —F or —CF$_3$; Z$^+$ is selected from: H$^+$, M$^+$ wherein M is an alkali metal, N(R)$_4^+$ wherein the R groups, equal or different from each other, are H or C$_1$–C$_6$ alkyls; R$_f$ is a polyperfluoroalkyleneoxide chain; are used for surface treatment of cellulosic (for instance wood or paper), metallic (either ferrous or non-ferrous), vitreous (for instance glass or vitrified ceramics) materials, or of cements, marbles, granites, and the like.

13 Claims, No Drawings

PROCESS FOR SURFACE TREATMENT OF CELLULOSIC, METALLIC, VITREOUS MATERIALS, OR CEMENTS, MARBLES, GRANITES AND THE LIKE

The present invention relates to a process for surface treatment of cellulosic, metallic, vitreous materials, or cements, marbles, granites, and the like.

It is known the use of poly-perfluoroalkyleneoxides having perfluoroalkyl end groups for protecting marble, stones, bricks, cement and similar materials from atmospheric agents and pollutants (see for instance U.S. Pat. No. 4,499,146). Such products, besides conferring water- and oil-repellence properties, are endowed with a high gas and vapour permeability, therefore they allow the protected material to "breathe". Moreover, thanks to a very low refractive index, poly-perfluoroalkyleneoxides do not change original appearance and colouring of the material, since no optical phenomena of interference and/or refraction occur.

The presence of porosity in the material to be protected causes migration phenomena of the poly-perfluoroalkyleneoxides from the surface to the inside of the material itself, with consequent reduction in time of protective action. Therefore, a remarkable improvement with respect to U.S. Pat. No. 4,499,146 consists in using poly-perfluoroalkyleneoxides functionalized with groups capable of anchoring the product to the substrate to be protected, such as carboxyl, ester, amide, hydroxyl, isocyanate, epoxy, silane, etc. groups, as described in U.S. Pat. Nos. 4,745,009 and 4,746,550. Various other functionalized poly-perfluoroalkyleneoxides are described in U.S. Pat. No. 4,085,137.

In U.S. Pat. No. 3,492,374 phosphoric diesters are described having formula:

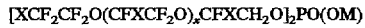

[XCF$_2$CF$_2$O(CFXCF$_2$O)$_x$CFXCH$_2$O]$_2$PO(OM)

wherein: X is —F or —CF$_2$; x is an integer from 1 to 8; M is a cation, such as H$^+$, an alkali metal ion, or an ammonium ion, optionally alkyl-substituted.

In the above patent it is suggested using these phosphoric diesters to give oil-repellence to various materials, among which: fabrics, fibers, leather, paper, plastic material coatings, wood, ceramics. No mention is made to possible water-repellence properties.

In European patent application EP-A-603,697 a process is described for imparting both oil- and water-repellence to the surface of porous ceramic materials, in particular of Tuscan cotto, by application of a phosphoric monoester having formula:

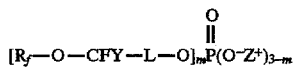

$$[R_f-O-CFY-L-O]_mP(O^-Z^+)_{3-m} \quad (I)$$

wherein:
L is a divalent organic group; m=1; Y is —F or —CF$_3$; Z$^+$ is selected from: H$^+$, M$^+$ where M is an alkali metal, N(R)$_4^+$ where the R groups, equal or diffent from each other, are H or C$_1$–C$_6$ alkyls; R$_f$ is a poly-pefluoroalkyleneoxide chain.

The Applicant has now found that the phosphoric monoesters of formula (I) can be used for surface treatment of a wide range of materials different from ceramics, to impart both water- and oil-repellence properties, which result both remarkably higher with respect to those obtainable with the phosphoric diesters of the same kind as described in U.S. Pat. No. 3,492,374 cited hereinabove.

Therefore, object of the present invention is a process for surface treatment of cellulosic (for instance wood or paper), metallic (either ferrous or non ferrous), vitreous (for instance glass or vitrified ceramics) materials, or of cements, marbles, granites and the like, which comprises applying onto the surface of said materials a phosphoric monoester having the formula:

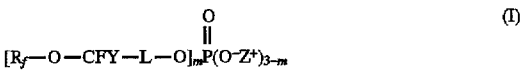

$$[R_f-O-CFY-L-O]_mP(O^-Z^+)_{3-m} \quad (I)$$

wherein:
L is a divalent organic group; m=1; Y is —F or —CF$_3$; Z$^+$ is selected from: H$^+$, M$^+$ where M is an alkali metal, N(R)$_4^+$ where the R groups, equal or diffent from each other, are H or C$_1$–C$_6$ alkyls; R$_f$ is a poly-perfluoroalkyleneoxide chain.

According to the process object of the present invention, the phosphoric monoester of formula (I) can be optionally in admixture with a phosphoric diester, corresponding to the formula (I) with m=2, and/or a phosphoric triester, corresponding to the formula (I) with m=3, in such an amount that the monoester content is at least equal to 80% by moles.

By L it is meant a divalent organic, preferably non-fluorinated, group which can be selected from:

(a) —CH$_2$—(OCH$_2$CH$_2$)$_n$—, wherein n is an integer from 0 to 3;

(b) —CO—NR'—(CH$_2$)$_q$—, wherein R' is H or a C$_1$–C$_4$ alkyl; q is an integer from 1 to 4.

The R$_f$ groups have preferably a number average molecular weight M$_n$ of from 350 to 3,000, preferably from 400 to 1,000, and are constituted by one or more repetitive units, statistically distributed along the chain, selected from: (C$_3$F$_6$O); (C$_2$F$_4$O); (CFXO), wherein X is —F or —CF$_3$; (CYZ—CF$_2$CF$_2$O), wherein Y and Z, equal or different from each other, are F, Cl or H.

The polyperfluoroalkyleneoxide chains R$_f$ can be selected in particular from the following classes:

$$T-O-(CF_2CF(CF_3)O)_m(CFXO)_n-CFZ- \quad (II)$$

wherein:
T is a (per)fluoroalkyl group selected from: —CF$_3$, —C$_2$F$_5$, —C$_3$F$_7$, —CF$_2$Cl, —C$_2$F$_4$Cl, —C$_3$F$_6$Cl; X is —F or —CF$_3$; Z is —F, —Cl or —CF$_3$; m and n are numbers such that the n/m ratio is from 0.01 to 0.5 and the molecular weight is in the range indicated above;

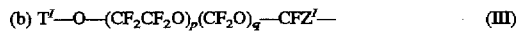

$$T'-O-(CF_2CF_2O)_p(CF_2O)_q-CFZ'- \quad (III)$$

wherein:
T' is a (per)fluoroalkyl group selected from: —CF$_3$, —C$_2$F$_5$, —CF$_2$Cl, —C$_2$F$_4$Cl; Z' is —F or —Cl; p and q are numbers such that the ratio q/p is from 0.5 to 2 and the molecular weight is in the range indicated above;

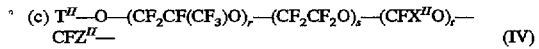

$$T''-O-(CF_2CF(CF_3)O)_r-(CF_2CF_2O)_s-(CFX^{II}O)_t-CFZ^{II}- \quad (IV)$$

wherein:
T'' is a (per)fluoroalkyl group selected from: —CF$_3$, —C$_2$F$_5$, —C$_3$F$_7$, —CF$_2$Cl, —C$_2$F$_4$Cl, —C$_3$F$_6$Cl; X'' is —F or —CF$_3$; Z'' is —F, —Cl or —CF$_3$; r, s and t are numbers such that r+s is from 1 to 50, the ratio t/(r+s) is from 0.01 to 0.05 and the molecular weight is in the range indicated above;

(d) 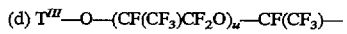     (V)

wherein:

$T^{III}$ is $—C_2F_5$ or $—C_3F_7$; and u is a number such that the molecular weight is in the range indicated above;

(e)      (VI)

wherein:

Y and Z, equal or different from each other, are F, Cl or H; $T^{IV}$ is $—CF_3$, $—C_2F_5$ or $—C_3F_7$; v is an number such that the molecular weight is in the range indicated above;

(f) 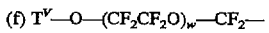     (VII)

wherein:

$T^V$ is $—CF_3$ or $—C_2F_5$; w is an number such that the molecular weight is in the range indicated above.

The phosphoric monoester of formula (I) can be used both in acidic form ($Z=H^+$) and salified with an alkali metal hydroxide ($Z=M^+$, with M=Li, Na, K, etc.) or with ammonia or with an amine ($Z=N(R)_4^+$). The groups R can be optionally hydroxy-substituted or can be linked each other so as to form a ring on the nitrogen atom, for instance of morpholinic type. The amount of phosphoric monoester of formula (I) to be used to obtain an effective action of water- and oil-repellence is extremely variable depending on surface characteristics of the material to be treated and on molecular weight of the monoester itself. For instance, for a standard Carrara marble, about 0.3 mg/cm² of a product of formula (I) having a chain $R_f$ with $M_n=700$ can be applied, while for a natural wood satisfactory results can be obtained with only 0.2 mg/cm²; even lower amounts, around 0.1 mg/cm², can be used for non-porous materials, for instance aluminum. In any event, depending on the specific conditions, for a person skilled in the art it is sufficient to carry out some tests to establish the optimum amount to be applied.

The monoester of formula (I) is preferably applied in the form of solution, with concentrations generally comprised from 0.1 to 5% by weight, preferably from 0.5 to 3% by weight. Suitable solvents, or solvent mixtures, can be selected from the following classes: aliphatic alcohols having from 1 to 4 carbon atoms; aliphatic glycols having from 2 to 6 carbon atoms, optionally having an esterified hydroxyl; fluorocarbons or chlorofluorocarbons optionally containing hydrogen; ketones or esters having from 3 to 10 carbon atoms; methylchloroform; poly-perfluoroalkyleneoxides having a low molecular weight (generally from 400 to 1,000) and fluoroalkyl end groups; etc. Solvent/non-solvent mixtures can also be employed, such as, for instance, ketone/water or alcohol/water mixtures in a ratio of from 10:90 to 90:10 by volume, or also (chloro)fluorocarbon/dimethylformamide or methylchloroform/dimethylformamide mixtures in a ratio of from 1:1 to 3:1 by volume.

The choice of the most suitable solvent depends on several factors. Firstly, it is necessary that the solvent be able to dissolve, in the desired concentration, the specific product of formula (I) which is intended to be used: to this purpose it is sufficient to carry out some solubility tests. Moreover, the solvent should quickly evaporate without changing in any way the surface appearance of the treated material, for instance it should not either leave halos or reduce, in the case of glass, transparence. In the case of metallic materials, no chemical attack from the solvent, with formation of corrosion spots and/or reduction of original gloss, should occur. To check whether the selected solvent meets these requirements the following test can be carried out. In the case of porous substrates, 20 ml of the solvent are dropped on a specimen of the material to be treated having an area of 450 cm²: after 2 hours at room temperature, the material surface should appear dry and without halos. In the case of metallic surfaces, a 10 cm×5 cm sample and 1 ml of the solvent can be used: after 2 hours from the application, at room temperature, the surface should appear dry, without halos or corrosion spots and with unaltered gloss.

The solvent suitability should be further verified by applying on a specimen of the material to be treated a solution constituted by the examined solvent and by the product of formula (I) which is intended to be used, in the desired concentration. The so treated surface is submitted to a water-repellence test according to the method described hereinbelow. The solvent is to be considered suitable if a sphericity index between A and C is obtained (see the scale reported below) and a dark halo at the water drop base does not appear (which indicates absorption onset) within 10 min from deposition. This additional test to verify solvent suitability is of particular importance when solvent/non-solvent mixtures are intended to be used. In those cases the solvent indeed could evaporate too quickly with respect to the non-solvent, causing an uneven distribution of the product on the treated surface.

The process object of the present invention can also be carried out by applying the phosphoric monoesters of formula (I) in the form of additives included in a conventional formulation for surface cleaning or protection, for instance, waxes having a paraffinic, acrylic, or siliconic base; detergent compositions based on anionic and/or non-ionic surfactants; paints; etc. The phosphoric monoesters can also be used in association with other known protecting and/or consolidating products, for example of silane or siloxane type.

Finally, the process object of the present invention can be used to obtain a top-coating on materials already treated with other substances (impregnating substances, paints, consolidating and protecting agents, etc.), for instance cements, marbles and the like on which a siliconic protecting/consolidating layer was previously applied.

The preparation of the phosphoric monoesters of formula (I) can be carried out by reacting the corresponding hydroxy-terminated poly-perfluoroalkyleneoxides $R_f$—O—CFY—L—OH with $POCl_3$, in a molar ratio such that $POCl_3$ is always in a large excess. Generally the molar ratio $POCl_3$/hydroxy-terminated product is from 5:1 to 10:1, preferably from 6:1 to 8:1. The reaction is carried out by slowly dropping the hydroxy-terminated product into $POCl_3$, in the presence of a base, for instance a tertiary amine, such as pyridine, triethylamine, tributylamine, at a temperature generally from 50° to 100° C., preferably from 70° to 90° C. The reaction is carried out, always under stirring, until the hydroxy groups disappear from the reaction mixture, as verified by infrared analysis. The $POCl_3$ excess is removed by distillation and the obtained product is hydrolyzed with an acid, for instance diluted hydrochloric acid. The organic phase is separated by extraction with a suitable organic solvent not soluble in water, for instance a chlorofluorocarbon or methylchloroform. The separation is preferably carried out in the presence of a co-solvent, for instance a water-soluble ketone, which has the purpose of avoiding formation of emulsions which would hinder separation of the organic product. The product is separated from the organic phase according to known techniques, for instance by solvent evaporation.

The monoesters are obtained from such reactions with high yields, usually in admixture with lower amounts of the corresponding di- and tri-esters.

The hydroxy-terminated poly-perfluoroalkyleneoxides $R_3$—O—CFY—L—OH are known products, and can be prepared according to known techniques starting from the corresponding poly(perfluoroalkylenoxides) having —COF end groups. The starting poly-perfluoroalkyleneoxides containing —COF end groups are described for instance in patents GB-1,104,482 (class (a)), U.S. Pat. No. 3,715,378 (class (b)), U.S. Pat. No. 3,242,218 (class (c)), U.S. Pat. No. 3,242,218 (class d)), EP-148,482 (class (e)), U.S. Pat. No. 4,523,039 (class (f)), or also in patent applications EP-340, 740 and WO 90/03357.

In particular, the products $R_f$—O—CFY—L—OH wherein L=—$CH_2(OCH_2CH_2)_n$— can be prepared by reduction of the corresponding acyl-fluorides and, if n≠0, subsequent ethoxylation reaction with ethylene oxide, as described, for instance, in patents U.S. Pat. Nos. 3,293,306, 3,847,978, 3,810,874 and 4,814,372.

The products with L=—CO—NR'—$(CH_2)_q$— can be prepared by reaction of the corresponding acyl-fluorides with an alkanol-amine of formula R'—NH—$(CH_2)_q$—OH.

The monophosphoric esters used in the process object of the present invention, besides giving a particularly high oil- and water-repellence degree, are also capable of anchoring in a stable manner to the various types of substrate. Therefore, in the case of porous materials, such as wood, paper, cement, marble, etc., no migration phenomena into the inner of the substrate itself have been noticed. Moreover, the treated surface maintains oil- and water-repellence properties also after several washings with the most common detergents.

Moreover, in the case of metal materials, either ferrous or non-ferrous, the application of phosphoric monoesters of formula (I) has remarkably reduced corrosion phenomena, which are mainly due to permanence on the metal of water, which acts as a carrier for corrosive substances (oxygen, air pollutants, etc.).

In the case of vitreous materials, generally very resistant to weathering phenomena, the process object of the present invention has substantially improved washability, thanks to a very reduced adhesion of dirt to the treated surface.

Finally, it is to be pointed out that the phosphoric monoesters of the present invention do not alter aesthetic characteristics of the treated material, particularly colouring, and, differently from a paint, do not form a coating film, hence they are permeable to gases and vapours, particularly to steam. Such properties are of particular importance for treatment of cellulosic materials, such as wood and paper, and of cements, marbles and the like.

The present invention is now better described by the following examples, which are given only for illustrative purposes and are not limitative of the scope of the invention itself.

EXAMPLES

Characterization

Oil- and water-repellence degrees were determined by examining the behaviour of an oil or water drop deposited on the treated surface.

In the case of materials showing absorption phenomena in extremely short times (for instance wood, marble, cement, etc.), two distinct parameters were considered: sphericity and absorption time of the drop. For substantially water-proof materials, such as glass, metals, etc., the only meaningful parameter to be considered is the sphericity of the drop.

The drop sphericity is per se a measure of liquid-repellence degree, and can be determined by measuring the contact angle, i.e. the angle identified by the substrate surface and the line tangential to the drop surface at the point contacting the surface itself. A perfectly spherical drop has a contact angle of 180°, while a flat drop has a contact angle tending to 0°.

Since a precise measurement of the contact angle is quite difficult, especially when irregular surfaces are treated, we have preferred to correlate to discrete ranges of contact angle a sphericity index according to the following scale:

| Sphericity Index | Contact angle |
|---|---|
| A | about 180° |
| B | 150°–180° |
| C | 120°–150° |
| D | 100°–120° |
| E | 80°–100° |
| F | 0°–80° |

To a sphericity index A corresponds a perfectly spherical drop, which has a practically punctiform contact surface; with B almost perfectly spherical drops have been classified, having a contact surface extremely reduced but not punctiform; the index C has been assigned to drops with good sphericity, having a contact surface fairly large but however always smaller than the drop size; with a D index the contact angle further decreases and correspondingly an increase in the contact surface occurs; to a sphericity index E a contact surface approximately equal to the drop size corresponds while for contact angles lower than 80° (sphericity index F) the drop tends to extend on the surface (spreading effect), with a contact surface greater than the initial drop size. The values reported in the Examples were averaged on 20 drops, having a volume of about 3 µl and deposited on 25 cm² of the material. For water-repellence demineralized water was used, for oil-repellence a paraffinic oil having a viscosity of 20 cSt (commercial product ESSO P60$^{(R)}$).

As regards the second parameter, i.e. the time for complete absorption of the drop by the surface of the treated material (in the following indicated as t), it is worthwhile to point out that in the case of water (water-repellence), the drop volume obviously decreases during time also because of evaporation, hence there is a maximum time limit within which evaluation is still possible. At room temperature, for a 3 µl water drop, a maximum time limit of 30 min was fixed. In the case of oil (oil-repellence), evaporation is quite negligible, therefore the maximum time was arbitrarily fixed at 10 days.

The onset of a possible absorption is shown by appearance of a dark halo at the drop base, which spreads during time and is accompanied by a proportional decrease in drop volume.

The evaluation scale of the absorption index was fixed as follows:

| Absorption index | t | |
|---|---|---|
| | Water (min) | Oil (hours) |
| a | 0 | 0 |
| b | 2.5 | 1 |
| c | 5 | 2 |
| d | 10 | 3 |

-continued

| Absorption index | t | |
|---|---|---|
| | Water (min) | Oil (hours) |
| e | 15 | 4 |
| f | 20 | 5 |
| g | 25 | 6 |
| h | 30 | 15 |
| i | — (*) | — (*) |

(*) no absorption

Both for water- and oil-repellence, the dark halo appears within 5 minutes from the drop deposition for absorption indexes from (a) to (d), within 10 minutes for indexes from (e) to (h). No halo is noticeable with an absorption index (i).

Analogously to the sphericity index, the values reported in the examples have been averaged on 20 drops, having a volume of about 3 μl and deposited on 25 cm² of the material. For water-repellence demineralized water was used, for oil-repellence, a paraffinic oil having a viscosity of 20 cSt (commercial product ESSO P60$^{(R)}$).

On the basis of the sphericity and absorption indexes determined according to the above described methods, the following evaluation was fixed, valid both for oil- and water-repellence:

| Oil- or water-repellence | Sphericity index | Absorption index |
|---|---|---|
| 0 | E | a |
| 1 | E | b |
| 2 | E | c |
| 3 | E | d |
| 4 | E | e |
| 5 | E | f |
| 6 | E | g |
| 6' | F | g |
| 7 | D | h |
| 8 | C | i |
| 9 | B | i |
| 10 | A | i |

Example 1

Onto a 4 cm×4 cm board of natural wood (cypress) were dropped 0.8 ml of a 3% by weight isopropanol solution of a mixture constituted by 90% by moles of a phosphoric monoester corresponding to the formula (I) with: L=—CH$_2$(OCH$_2$CH$_2$)—; m=1; Z$^+$=H$^+$; Rf is a Galden$^{(R)}$ Y chain (formula (II)), having M$_n$=700, M$_w$/M$_n$=1.3, m/n=20. The remaining 10% consists of a mixture of the corresponding diester (m=2) and triester (m=3).

The solvent was evaporated by a hot air jet. Then water- and oil-repellence were evaluated according to the method described above. The values are reported in Table 1.

The applied monoester was obtained as follows. 200 g (0.277 moles) of the corresponding hydroxy-terminated Galden$^{(R)}$ Y were dropped slowly (in 4 hours) and under stirring into 255 g of POCl$_3$ (POCl$_3$/Galden molar ratio= 6:1). The reaction mixture was kept under stirring for an additional hour. The temperature was kept at 90° C. for the whole duration of the reaction. The POCl$_3$ excess was removed by distillation (at 50° C./20 mm Hg). The distillation residue was then hydrolized by adding 60 ml of H$_2$O. After addition of 90 ml of A113 (CF$_2$Cl—CFCl$_2$) and 35 ml of acetone, the organic phase was separated in a separation funnel. The product present in the organic phase was dried by evaporation of the solvents (at 80° C./1 mbar). 192 g of product consisting of 90% by moles of monoester and of 10% by moles of di- and tri-esters were obtained, as determined by acidimetric titration and $^{31}$P-NMR analysis.

Example 2

Example 1 was repeated in the same conditions and with the same product in the form of a 3% by weight solution, using as solvent an isopropanol/water mixture with a 20:80 by volume ratio. The water- and oil-repellence values are reported in Table 1.

Example 3 (Comparative)

Example 1 was repeated using 0.8 ml of a 3% by weight A-113 (CF$_2$Cl—CFCl$_2$) solution of a mixture consisting of 70% by moles of a phosphoric diester corresponding to the formula (I) with: L=—CH$_2$(OCH$_2$CH$_2$)—; m=2; Z$^+$=H$^+$; Rf is a Galden$^{(R)}$ Y chain (formula II)), having M$_n$=700, M$_w$/M$_n$=1.3, m/n=20. The remaining 30% consists of a mixture of the corresponding monoester (m=1) and triester (m=3).

The water- and oil-repellence values are reported in Table 1.

The applied diester was obtained as follows. 500 g (0.552 moles) of the corresponding hydroxy-terminated Galden$^{(R)}$ Y were dropped slowly (in 3 hours) and under stirring into 453 g of POCl$_3$ (POCl$_3$/Galden molar ratio=5.4:1). The reaction mixture was kept under stirring for an additional hour. The temperature was kept at 90° C. for the whole duration of the reaction. The POCl$_3$ excess was removed by distillation (at 50° C./20 mm Hg). Additional 500 g of hydroxy-terminated Galden$^{(R)}$ Y were then added slowly (for 3 hours) and under stirring to the distillation residue, heated at 90° C. After an additional hour at 90° C., the reaction mixture was diluted with 300 ml of A113 and then hydrolyzed by adding a mixture consisting of 200 ml of H$_2$O and 120 ml of acetone. The phases were then separated in a separation funnel. The product present in the (inferior) organic phase was dried by solvent evaporation (at 80° C./1 mbar). 1027 g of product consisting of 10% by moles of monoester, 70% by moles of diester and 20% by moles of triester, were obtained, as measured by acidimetric titration and $^{31}$P-NMR analysis.

Example 4 (Comparative)

Example 1 was repeated using 0.8 ml of a 3% by weight isopropanol solution of a product of formula:

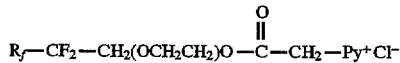

$$R_f\text{—}CF_2\text{—}CH_2(OCH_2CH_2)O\text{—}\underset{\underset{O}{\|}}{C}\text{—}CH_2\text{—}Py^+Cl^-$$

wherein: Py is a pyridine ring, R$_f$ is a Galden$^{(R)}$ Y chain (formula (II)), with M$_n$=700, M$_w$/M$_n$=1.3 and m/n=20.

Such product was obtained, as described in U.S. Pat. No. 5,294,248, by esterification reaction of a hydroxy-derivative of formula R$_f$—CF$_2$—CH$_2$(OCH$_2$CH$_2$)OH with chloroacetic acid and subsequent quaternization reaction with pyridine in isopropanol.

The water- and oil-repellence values are reported in Table 1.

Example 5 (Comparative)

Example 1 was repeated using 0.8 ml of a 3% by weight A-113 solution of Galden$^{(R)}$ Z-DOL, having the formula:

HO—CH$_2$—CF$_2$O(CF$_2$CF$_2$O)$_p$(CF$_2$O)$_q$CF$_2$—CH$_2$—OH wherein M$_n$=700, and p/q=0.7.

The water- and oil-repellence values are reported in Table III.

Example 6 (Comparative)

Example 1 was repeated using a microemulsion constituted by:

20% by weight of a mixture between Galden$^{(R)}$ Y carboxylate R$_f$—COO$^-$NH$_4^+$ and the corresponding ketone R$_f$—CO—CF$_3$, in 1:2 molar ratio, wherein R$_f$ is a Galden$^{(R)}$ Y chain (formula (II)), having M$_n$=2700, M$_w$/M$_n$=1.3 and m/n=35; said mixture was obtained, according to known techniques, by acid hydrolysis and subsequent salification with ammonia of the product deriving from thermal treatment (200°–250° C.) of the raw product of photooxidation of hexafluoropropene with O$_2$;

20% by weight of tertbutanol (co-solvent);

60% by weight of demineralized water.

The microemulsion was applied after dilution with water so as to have a fluorinated product concentration of 2% by weight.

The water- and oil-repellence values are reported in Table 1.

TABLE 1

| EX. | APPLIED PRODUCT | WATER-REPELLENCE | OIL-REPELLENCE |
|---|---|---|---|
| 1 | Galden$^{(R)}$ Y phosphoric monoester | 8 | 8 |
| 2 | Galden$^{(R)}$ Y phosphoric monoester | 8 | 8 |
| 3(*) | Galden$^{(R)}$ Y phospohoric diester | 6 | 7 |
| 4(*) | Galden$^{(R)}$ Y pyridinium salt | 1 | 7 |
| 5(*) | Galden$^{(R)}$ Z-DOL | 7 | 6 |
| 6(*) | Galden$^{(R)}$ Y ammonium carboxylate and corresponding ketone | 5 | 5 |

(*) comparative

Example 7

A 10 cm×5 cm aluminum plaque, thoroughly cleaned and polished to remove possible oxides, was treated with the same 3% by weight isopropanol solution of the phosphoric monoester of Example 1, in such an amount to obtain a surface coating of 1 g of monoester per m$^2$. The solvent was evaporated by a hot air jet. The water- and oil-repellence were then evaluated by the sphericity index, as described above. The results are reported in Table 2.

Another treated plaque was submitted to fog chamber corrosion test for 240 hours using demineralized water. According to such test, described in U.S. Pat. No. 5,000,864, (Method ASTM B-117 modified), corrosion level can vary from 0 (no trace of corrosion) to 5 (100% of the surface is corroded); for each test two values are reported, the former refers to the face directly exposed to steam, the latter to the face not directly exposed. The results are reported in Table 2.

Example 8 (Comparative)

Example 7 was repeated using the same 3% by weight A-113 solution of the phosphoric diester of Example 3.

The water- and oil-repellence values, expressed by the sphericity index, are reported in Table 2.

Example 9 (Comparative)

Example 7 was repeated using the same 2% by weight A-113 solution of Galden$^{(R)}$ Z-DOL of Example 5.

The water- and oil-repellence values, expressed by the sphericity index, are reported in Table 2.

Example 10 (Comparative).

Example 7 was repeated using the same microemulsion of Galden$^{(R)}$ Y ammonium carboxylate and the corresponding ketone of Example 6.

The treated plaque was submitted to the fog chamber corrosion test described in Example 7. The obtained results are reported in Table 2.

TABLE 2

| EX | APPLIED PRODUCT | WATER-REPELLENCE | OIL-REPELLENCE | CORROSION DEGREE |
|---|---|---|---|---|
| 7 | Galden$^{(R)}$ Y phosphoric monoester | D | D | 0–0 (240 hours) |
| 8(*) | Galden$^{(R)}$ Y phosphoric diester | E | E | — |
| 9(*) | Galden$^{(R)}$ Z-DOL | F | F | — |
| 10(*) | Galden$^{(R)}$ Y ammonium carboxylate and corresponding ketone | — | — | 3–3 (100 hours) 4–5 (200 hours) |

(*) comparative

Example 11

On a 5 cm×5 cm undressed Carrara marble tile 1.0 ml of an isopropanol/water (20:80 volume ratio) 1% by weight solution of the same phosphoric monoester of Example 1 were dropped.

The solvent was evaporated keeping the tile at room temperature for 2 hours. The water- and oil-repellence were then evaluated by sphericity and absorption indexes, as described above. The values are reported in Table 3.

Example 12

Example 11 was repeated using a 5 cm×5 cm dressed granite tile. The water- and oil-repellence values are reported in Table 3.

Example 13

Example 11 was repeated using a 5 cm×5 cm dressed onyx tile. The water- and oil-repellence are reported in Table 3.

Examples 14–16 (Comparative)

Examples 11–13 were repeated using, instead of the phosphoric monoester solution, a 1% by weight A-113 solution of a non-functional Galden$^{(R)}$ Y, corresponding to the formula (II) with CF$_3$ end group, having M$_n$=1500, obtained by fractional distillation of the corresponding commercial product. The water- and oil-repellence values are reported in Table 3.

Examples 17–19 (Comparative)

Examples 11–13 were repeated using, instead of the phosphoric monoester solution, a 1% by weight A-113 solution of the same phosphoric diester of Example 3. The water- and oil-repellence values are reported in Table 3.

TABLE 3

| EX. | TREATED MATERIAL | APPLIED PRODUCT | WATER-REPELLENCE | OIL-REPELLENCE |
|---|---|---|---|---|
| 11 | Carrara marble | Galden(R) Y | 8 | 8 |
| 12 | Granite | phosphoric | 8 | 8 |
| 13 | Onyx | monoester | 8 | 8 |
| 14(*) | Carrara marble | Galden(R) Y | 2 | 0 |
| 15(*) | Granite | | 4 | 0 |
| 16(*) | Onyx | | 4 | 0 |
| 17(*) | Carrara marble | Galden(R) Y | 5 | 7 |
| 18(*) | Granite | phosphoric | 6 | 7 |
| 19(*) | Onyx | diester | 6 | 7 |

(*) comparative

Example 20

On a 5 cm×5 cm cement block having 4 cm height, 1.0 ml of a 1% by weight isopropanol/water (20:80 volume ratio) solution of the same phosphoric monoester of Example 1 were dropped.

The solvent was evaporated keeping the sample at room temperature for 2 hours. The water- and oil-repellence were then evaluated by sphericity and absorption indexes, as described above. The values are reported in Table 4.

Example 21 (Comparative)

Example 20 was repeated using instead of the phosphoric monoester solution, a 1% by weight A113 solution of the same non-functional Galden(R) Y of Example 14. The water- and oil-repellence values are reported in Table 4.

Example 22 (Comparative)

Example 20 was repeated using, instead of the phosphoric monoester solution, the same microemulsion of Galden(R) Y ammonium carboxylate in admixture with the corresponding ketone of Example 6, diluted with water in such an amount to obtain an overall fluorinated product concentration of 4% by weight. The water- and oil-repellence values are reported in Table 4.

TABLE 4

| EX. | APPLIED PRODUCT | WATER-REPELLENCE | OIL-REPELLENCE |
|---|---|---|---|
| 20 | Galden(R) Y phosphoric monoester | 9 | 8 |
| 21(*) | Galden(R) Y | 2 | 0 |
| 22(*) | Galden(R) Y ammonium carboxylate and corresponding ketone | 2 | 6 |

(*) comparative

Example 23

A 2.5 cm×7.5 cm microscope glass slide was thoroughly cleaned with acetone and subsequently with A-113. 1.0 ml of a 1% by weight isopropanol/water (20:80 volume ratio) solution of the same phosphoric monoester of Example 1 were then dropped thereon.

The solvent was then evaporated keeping the slide at room temperature for 10 min. Upon polishing with a cotton cloth, water- and oil-repellence were evaluated by the sphericity index, as described above. The values are reported in Table 5.

Example 24 (Comparative)

Example 23 was repeated using, instead of the phosphoric monoester solution, a 1% by weight A113 solution of the same non-functional Galden(R) Y of Example 14. The water- and oil-repellence values are reported in Table 5.

Example 25 (Comparative)

Example 23 was repeated using, instead of the phosphoric monoester solution, a 1% by weight A-113 ($CF_2Cl$—$CFCl_2$) solution of the same mixture comprising 70% by moles of the phosphoric diester of Example 3. The water- and oil-repellence values are reported in Table 5.

TABLE 5

| EX. | APPLIED PRODUCT | WATER REPELLENCE | OIL REPELLENCE |
|---|---|---|---|
| 23 | Galden(R) Y phosphoric monoester | D | D |
| 24(*) | Galden(R) Y | E | E |
| 25(*) | Galden(R) Y ammonium phosphoric diester | E | E |

(*) comparative

We claim:

1. Process for surface treatment of a material selected from the group consisting of cellulosic materials, metallic materials, vitreous materials, cements, marbles, and granites, which comprises applying onto a surface of said material a phosphoric monoester having the formula:

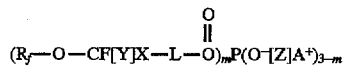

$$(R_f-O-CF[Y]X-L-O)_m P(O-[Z]A^+)_{3-m} \quad (I)$$

wherein:

$R_f$ is a polyperfluoro-alkyleneoxide chain, X is —F or —$CF_3$, L is a divalent organic group, m–1, and $A^+$ is selected from the group consisting of $H^+$, $M^+$ where M is an alkali metal, and $N(R)_4^+$ where the R groups, equal or different from each other, are H or $C_1$–$C_4$ alkyls.

2. Process according to claim 1, wherein the phosphoric monoester of formula (I) is in admixture with a phosphoric diester, corresponding to the formula (I) with m=2, and/or a phosphoric triester, corresponding to the formula (I) with m=3, in such amounts that the content of the monoester is at least equal to 80% by moles.

3. Process according to any one of the previous claims, wherein the L group is selected from the group consisting of:

(a) —$CH_2$—($OCH_2CH_2$)$_n$—, wherein n is an integer of from 0 to 3; and (b) —CO—NR'—($CH_2$)$_q$—, wherein R' is H or a $C_1$–$C_4$ alkyl; q is an integer from 1 to 4.

4. Process according to claim 1, wherein the $R_f$ chain is constituted by one or more repetitive units, statistically distributed along the chain, selected from the group consisting of:

($C_3F_6O$), ($C_2F_4O$), (CFXO), wherein X is —F or —$CF_3$, and (CYY'—$CF_2CF_2O$), wherein Y and Y', equal or different from each other, are —F, —Cl and —H;

and the $R_f$ chain has a number average molecular weight of from 350 to 3,000.

5. Process according to claim 4, wherein the $R_f$ chain has a number average molecular weight of from 400 to 1,000.

6. Process according to claim 4, wherein the $R_f$ chain is selected from the group consisting of:

(a) T—O—($CF_2CF(CF_3)O$)$_m$(CFXO)$_n$—CFZ—  (II)

wherein:

T is selected from the group consisting of:

—$CF_3$, —$C_2F_5$, —$C_3F_7$, —$CF_2Cl$, —$C_2F_4Cl$, or —$C_3F_6Cl$; X is —F or —$CF_3$; Z is —F, —Cl or —$CF_3$; and m and n are numbers such that the n/m ratio is from 0.01 to 0.5 and the molecular weight is in the range from 350 to 3,000;

(b) $T^I$—O—$(CF_2CF_2O)_p(CF_2O)_q$—$CFZ^I$—  (III)

wherein:

$T^I$ is selected from the group consisting of:

—$CF_3$, —$C_2F_5$, —$CF_2Cl$, or —$C_2F_4Cl$; $Z^I$ is —F or —Cl; and p and q are numbers such that the ratio q/p is from 0.5 to 2 and the molecular weight is in the range from 350 to 3,000;

(c) $T^{II}$—O—$(CF_2CF(CF_3)O)_r$—$(CF_2CF_2O)_s$—$(CFX^{II}O)_t$—$CFZ^{II}$—  (IV)

wherein:

$T^{II}$ is selected from the group consisting of:

—$CF_3$, —$C_2F_5$, —$C_3F_7$, —$CF_2Cl$, or —$C_2F_4Cl$, $X^{II}$ is —F or —$CF_3$; $Z^{II}$ is —F, —Cl or —$CF_3$; r, s and t are numbers such that r+s is from 1 to 50, and the ratio t/(r+s) is from 0.01 to 0.05 and the molecular weight is in the range from 350 to 3,000;

(d) $T^{III}$—O—$(CF(CF_3)CF_2O)_u$—$CF(CF_3)$— wherein:

$T^{III}$ is —$C_2F_5$ or —$C_3F_7$; and u is a number such that the molecular weight is in the range from 350 to 3,000;

(e) $T^{IV}$—O—$(CY^{IV}Z^{IV}$—$CF_2CF_2O)_v$—$CY^{IV}Z^{IV}$—$CF_2$—  (VI)

wherein:

$Y^{IV}$ and $Z^{IV}$, equal or different from each other, are —F, —Cl or —H; $T^{IV}$ is —$CF_3$, —$C_2F_5$ or —$C_3F_7$; and v is a number such that the molecular weight is in the range from 350 to 3,000; and (f) $T^V$—O—$(CF_2CF_2O)_w$—$CF_2$— wherein:

$T^V$ is —$CF_3$ or —$C_2F_5$; and w is a number such that the molecular weight is in the range from 350 to 3,000.

7. Process according to claim 1, wherein the phosphoric monoester is applied in the form of a solution with a concentration of from 0.1 to 5% by weight.

8. Process according to claim 7, wherein the phosphoric monoester is applied in the form of a solution in a solvent selected from at least one of the group consisting of: aliphatic alcohols having from 1 to 4 carbon atoms; aliphatic glycols having from 2 to 6 carbon atoms; fluorocarbons or chlorofluorocarbons; ketones or esters having from 3 to 10 carbon atoms; methylchloroform; and polyperfluoroalkyleneoxides having fluoroalkyl end groups.

9. Process according to claim 7, wherein the phosphoric monoester is applied in the form of a solution in a solvent/non-solvent mixture selected from the group consisting of: ketone/water, alcohol/water, (hydrogen)chlorofluorocarbon/dimethylformamide, and methylchloroform/dimethylformamide.

10. Process according to claim 1, wherein the phosphoric monoester of formula (I) is applied in the form of an additive of a formulation for surface polishing or protection.

11. Process according to claim 1, wherein the phosphoric monoester of formula (I) is applied on a material already treated with impregnating substances, paints, reinforcing agents, or protective agents.

12. Process according to claim 8, wherein the aliphatic glycols having from 2 to 6 carbon atoms contain esterified hydroxyl.

13. Process according to claim 8, wherein the fluorocarbons or chlorofluorocarbons contain hydrogen.

* * * * *

UNITED STATES PATENT AND TRADEMARK OFFICE
CERTIFICATE OF CORRECTION

PATENT NO. : 5,691,000
DATED : November 25, 1997
INVENTOR(S) : Laura MONTAGNA et al.

It is certified that error appears in the above-identified patent and that said Letters Patent is hereby corrected as shown below:

Claim 1, column 12, line 30, formula (I), $$"(R_f\text{-O-CF[Y]X-L-O})_m P(O^-[Z]A^+)_{3-m}"$$ should read $$--"(R_f\text{-O-CFX-L-O})_m P(O^-A^+)_{3-m}--; \text{ and}$$

line 37, "$C_1$-$C_4$" should read --"$C_1$-$C_6$"--.

Signed and Sealed this

Tenth Day of February, 1998

*Attest:*

BRUCE LEHMAN

*Attesting Officer*     *Commissioner of Patents and Trademarks*